US006397137B1

(12) United States Patent
Alpert et al.

(10) Patent No.: US 6,397,137 B1
(45) Date of Patent: May 28, 2002

(54) SYSTEM AND METHOD FOR SELECTION OF VEHICULAR SIDEVIEW MIRRORS VIA EYE GAZE

(75) Inventors: Sherman R. Alpert, Briarcliff Manor, NY (US); Shumin Zhai, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/798,495

(22) Filed: Mar. 2, 2001

(51) Int. Cl.[7] .............................................. G06F 19/00
(52) U.S. Cl. ......................... 701/49; 359/877; 351/209
(58) Field of Search ...................... 701/49, 1; 351/209, 351/210; 359/877, 872, 841, 843

(56) References Cited

U.S. PATENT DOCUMENTS

| | | | |
|---|---|---|---|
| 4,158,483 A | 6/1979 | Fisher et al. | 359/289 |
| D276,514 S | 11/1984 | Evnvall et al. | D12/187 |
| 4,973,149 A | 11/1990 | Hutchinson | 351/210 |
| 5,016,282 A | 5/1991 | Tomono et al. | 382/117 |
| 5,274,505 A | 12/1993 | Nagayama et al. | 359/874 |
| 5,801,823 A | * 9/1998 | Brandin | 250/559.3 |
| 5,861,940 A | 1/1999 | Robinson et al. | 351/221 |
| 5,896,238 A | 4/1999 | Hubscher et al. | 359/877 |
| D427,127 S | 6/2000 | Horowitz | D12/187 |
| 6,200,139 B1 | * 3/2001 | Clapper | 434/62 |

OTHER PUBLICATIONS

Hinckley et al., "Touch–Sensing Input Devices", Proceedings of 1999 ACM Conference on Human Factors in Computing, pp. 223–230 (month is not available).

Zhai et al., "Manual And Gaze Input Cascaded (MAGIC) Pointing", Proceedings of the 1999 ACM Conference on Human Factors in Computing, pp. 246–253. (month is not available).

Morimoto et al., "Pupil Detection and Tracking Using Multiple Light Sources", 1998, IBM Almaden Research Center, San Jose, CA (month is not available).

U.S. Patent Appln. Ser. No. 09/225,476, filed Jan. 4, 1999, entitled "Method and Apparatus for Determining Eye Contact", Inventors: Arnon Amir, Myron Dale Flickner, David Bruce Koons, Carlos Hitoshi Morimoto and Shumin Zhai.

* cited by examiner

Primary Examiner—Tan Nguyen
(74) Attorney, Agent, or Firm—F. Chau & Associates, LLP; Louis J. Percello

(57) ABSTRACT

A system and method for automatic selection of a vehicular sideview mirror using the eye gaze of a vehicle operator. Once a particular sideview mirror is selected, it can be adjusted as desired by the vehicle operator. The method and system includes an eye contact detection device or eye gaze tracking device for selecting a left or a right vehicle sideview mirror to adjust by detecting an eye gaze of the vehicle operator.

21 Claims, 13 Drawing Sheets

SYSTEM AND METHOD FOR SELECTION OF VEHICULAR SIDEVIEW MIRRORS VIA EYE GAZE

BACKGROUND

1. Technical Field

The present invention relates generally to electrically operated remote-control adjustable vehicular sideview mirrors. More specifically, the invention relates to a method and apparatus for the selection of a vehicular sideview mirror using eye gaze, wherein once selected, the sideview mirror can be adjusted by the vehicle operator.

2. Description of Related Art

Automotive vehicles, such as cars and trucks, as well as other small vehicles, utilize rear-facing external sideview mirrors to allow a vehicle operator to see to the rear and sides of the vehicle. These sideview mirrors are located on the left and right sides of the driver-passenger compartment (hereafter, "operator compartment") of the vehicle. They comprise a housing and a positionable mirror pane (see U.S. Pat. No. Des. 276,514, "Sideview mirror for an automobile," Envall et al., Nov. 27, 1984; and U.S. Pat. No. Des. 427,127, "Exterior auto sideview mirror," Horowitz, Jun. 27, 2000). By appropriate positioning of the mirror pane, the operator of the vehicle is able to see rearward to view the areas to the sides of the vehicle and further rearward.

Traditionally, each sideview mirror pane can be adjusted by an electrical remote control device whose controls reside inside the operator compartment, allowing the operator to look at a sideview mirror and to remotely adjust its mirror pane to provide the best view given the location of the operator's eye(s). (See U.S. Pat. No. 4,158,483, "Remote controlled rearview mirror," Fisher et al., Jun. 19, 1979; U.S. Pat. No. 5,896,238, "Exterior rearview mirror for motor vehicles," Hübscher et al., Apr. 20, 1999; and U.S. Pat. No. 5,274,505, "Electrical remote-control mirror assembly," Nagayama et al., Dec. 28, 1993). The remote-control mirror pane adjustment mechanism typically provides four directions of movement for moving the mirror pane up, down and to each side. The adjustment mechanism can be in the form of four cursors or a joystick-like control. Although a vehicle typically has at least two sideview mirrors, there is usually only one remote-control mirror pane adjustment mechanism. The remote-control mirror pane adjustment mechanism adjusts whichever sideview mirror is currently "selected." To remotely adjust the two sideview mirrors of a vehicle involves first looking at one of the sideview mirrors, for example, the left mirror, manually switching a mirror selector switch to select the left mirror (that is, moving the positionable portion of the switch to the position that indicates the left mirror is selected), and manipulating the remote-control mirror pane adjustment mechanism. The same process is then performed for the second sideview mirror: looking at the right sideview mirror, remembering to switch the selector switch to the position indicating the right mirror and manually positioning that switch, and adjusting the mirror pane using the remote-control mirror pane adjustment mechanism.

Known selector switches are used to determine which of the two sideview mirrors is to be adjusted by the mirror pane adjustment control. The selector switch typically has three detents for selecting either the left sideview mirror, a neutral position where neither mirror is selected, or the right sideview mirror.

In current practice, remotely adjusting vehicular sideview mirrors involves a number of steps: sliding/flipping/toggling a switch (the mirror selector switch) to indicate the operator's choice of which mirror (the left or right sideview mirror) is to be adjusted, and then manipulating a second remote control mirror pane adjustment mechanism while watching the mirror movement to position the selected mirror pane. The operator then must repeat the entire process to adjust the second sideview mirror. In light of the above, there are typically numerous steps involved in remotely adjusting vehicular sideview mirrors (in practice, the number of steps is further increased by steps which involve looking away from a sideview mirror when having to locate the mirror selector switch, the remote-control mirror pane adjustment mechanism, and when moving from one step to another). Such a myriad of steps interrupt the flow of accomplishing a simple task. Accordingly, an efficient, simplified and accurate technique for automatically selecting a sideview mirror to be adjusted, is highly desirable.

SUMMARY OF THE INVENTION

The present invention is directed to a system and method for selecting remote controlled vehicular sideview mirrors. Advantageously, the present invention significantly reduces the number of steps a vehicle operator must perform to adjust a vehicle's side view mirrors, thus simplifying the mirror adjustment process and in turn reducing the chance for human error. In addition, an aspect of the present invention advantageously allows the vehicle operator to automatically select and adjust a particular sideview mirror without having to continuously look at that particular sideview mirror.

According to one aspect of the present invention, a system for selecting a sideview mirror of a vehicle is provided comprising an eye gaze detector for detecting an eye gaze of an operator; a data processing apparatus for receiving input from the eye gaze detector and determining whether the operator is looking at a sideview mirror, wherein if the operator is looking at the sideview mirror, the sideview mirror is selected; and a mirror adjustment control for adjusting the selected sideview mirror.

In another aspect of the present invention, a method of automatically selecting a sideview mirror in a vehicle is provided comprising the steps of activating an eye gaze contact detector for detecting eye contact in a sideview mirror; and determining if an operator is looking at the sideview mirror using a data processing apparatus, wherein if the operator is looking at the sideview mirror, a mirror selector switch is set to select the sideview mirror for adjustment by the operator using a mirror adjustment control.

In yet another aspect of the present invention, a method of automatically selecting a sideview mirror is provided comprising the steps of activating an eye gaze tracking device for detecting a direction of an eye gaze of an operator; determining if the operator is looking towards a first sideview mirror using a data processing apparatus, wherein if the operator is looking towards the first sideview mirror, a mirror selector switch is set to select the first sideview mirror to be adjusted by the operator using a mirror adjustment control, and if the operator is not looking towards the first sideview mirror, further comprising the steps of: determining if the operator is looking towards the second sideview mirror using the data processing apparatus, wherein if the operator is looking towards the second sideview mirror, the mirror selection switch is set to select the second sideview mirror to be adjusted by the operator using the mirror adjustment control. It is to be noted that the first sideview mirror can comprise, for example, a left sideview mirror, and the second sideview mirror can comprise, for example, a right sideview mirror.

These, and other aspects, features and advantages of the present invention will be described or become apparent from the following detailed description of the preferred embodiments, which is to be read in connection with the accompanying drawings.

DETAILED DESCRIPTION OF PREFERRED EMBODIMENTS

Figure 1:
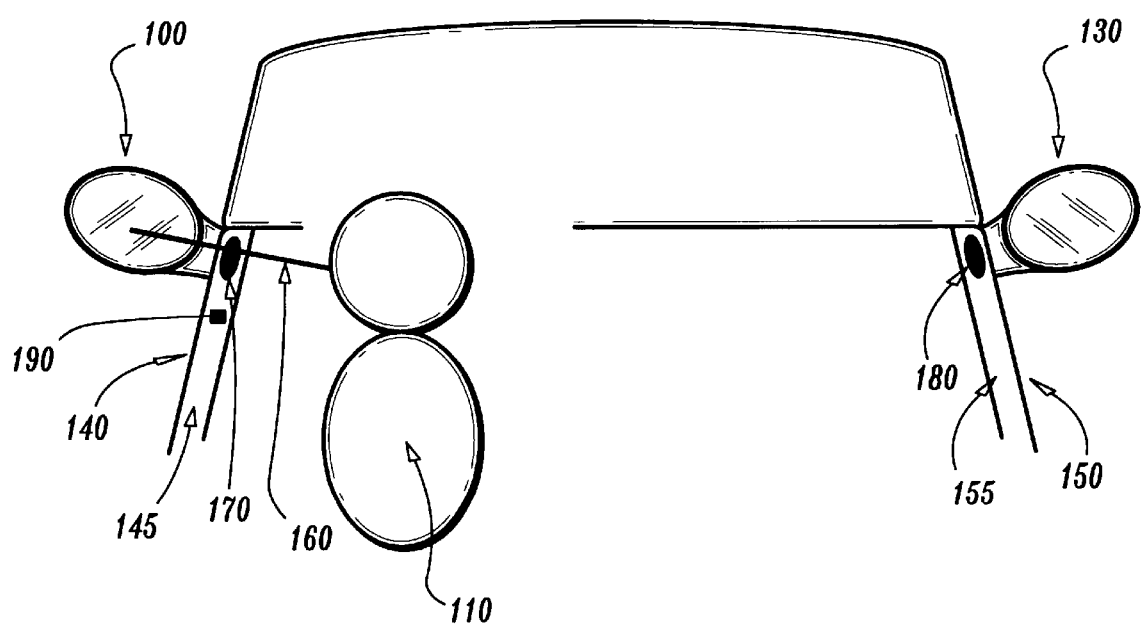
FIG. 1 is an exemplary illustration of a view from inside a vehicle's operator compartment of a system setup for selection of vehicular sideview mirrors using eye gaze contact detectors, according to an embodiment of the present invention.

A system suitable for practice of one embodiment of the present invention is illustrated in FIG. 1. This figure shows the system from inside a vehicle operator compartment and includes a left sideview mirror 100 comprising a mirror housing and a movable mirror pane which can be moved by a mirror pane positioning apparatus. The left sideview mirror 100 is connected to a left door 140 of the vehicle, the left door including an interior left door panel 145. The left sideview mirror 100 comprises a housing for holding a mirror pane which is movably connected inside the housing. The interior left door panel 145 includes a left eye gaze contact detector 170 for detecting an eye gaze of a vehicle operator 110, and a mirror adjustment control 190 for adjusting the mirror pane of the selected sideview mirror. For illustrative purposes, here the operator's current eye gaze 160 is directed towards the left sideview mirror 100. It is to be noted that the mirror pane positioning apparatus may comprise for example, motors, etc. for moving the mirror pane in response to the operator's manipulation of the mirror adjustment control.

The system also includes a right sideview mirror 130 comprising a mirror housing and a movable mirror pane which can be moved by a mirror pane positioning apparatus. The right sideview mirror is connected to a right side door 150 of the vehicle, the right door also including an interior right door panel 155. The interior right door panel 155 includes a right eye gaze contact detector 180 for detecting an eye gaze of the vehicle operator.

Figure 2A:
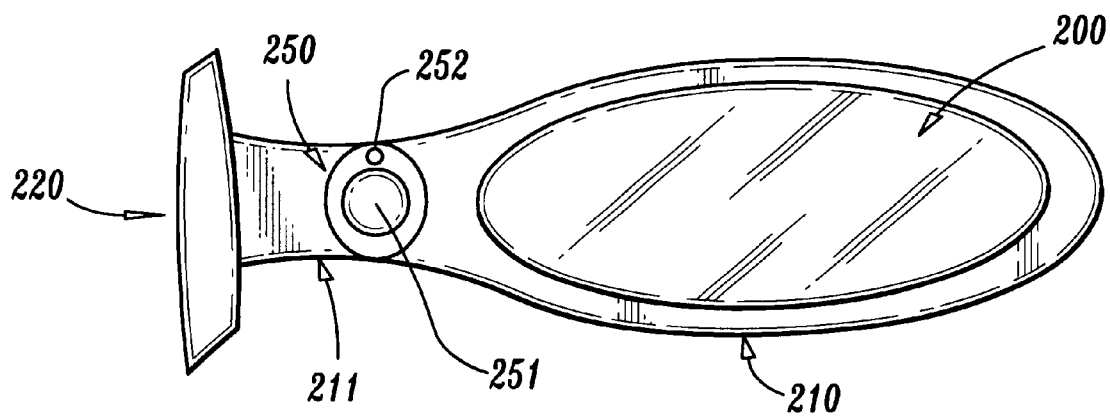
FIG. 2A depicts an exemplary sideview mirror with eye gaze contact detectors disposed in one position according to an embodiment of the present invention.
Figure 2B:
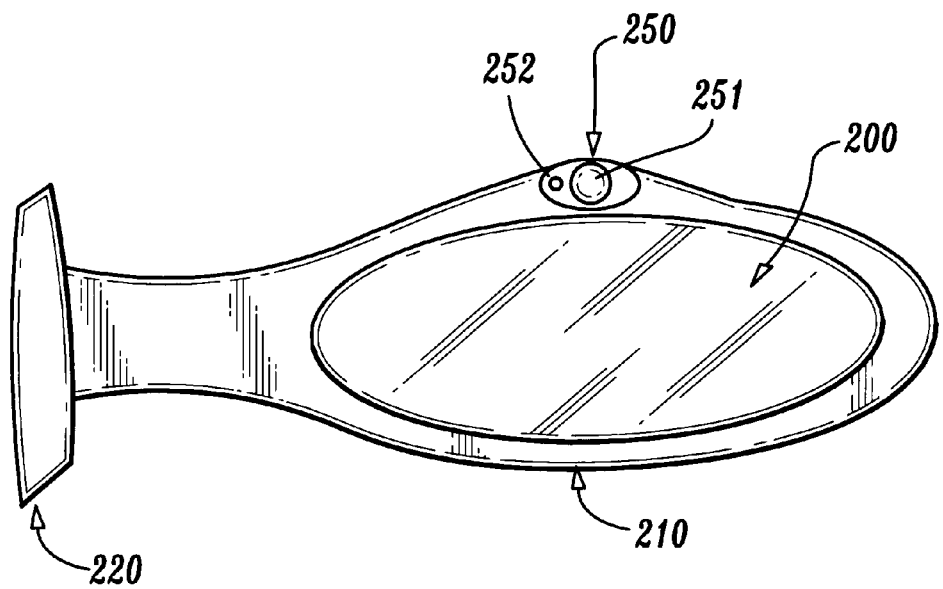
FIG. 2B depicts another exemplary placement of the eye gaze contact detectors according to an embodiment of the present invention.
Figure 2C:
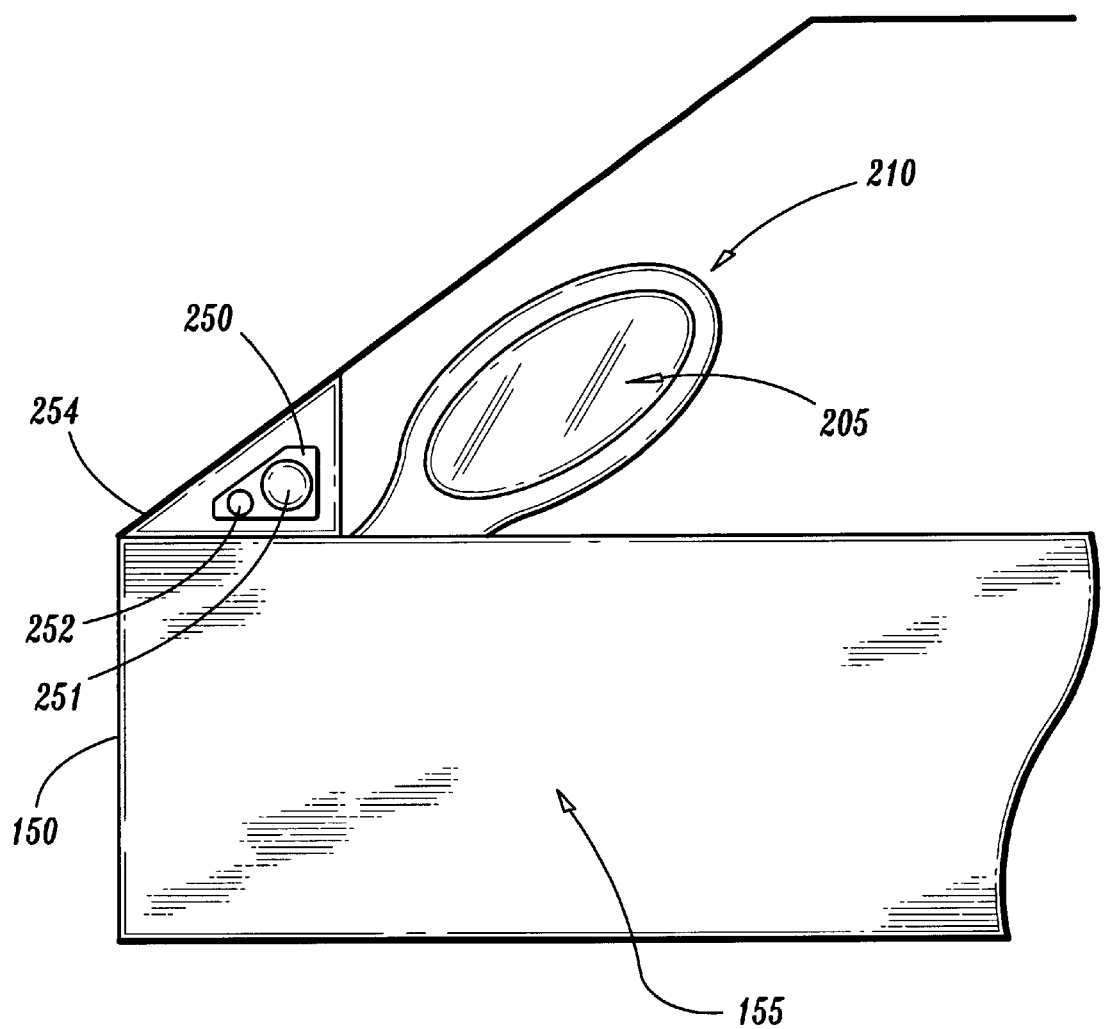
FIG. 2C depicts an exemplary placement of the eye gaze contact detectors in one position inside a vehicular operator compartment according to an embodiment of the present invention.
Figure 2D:
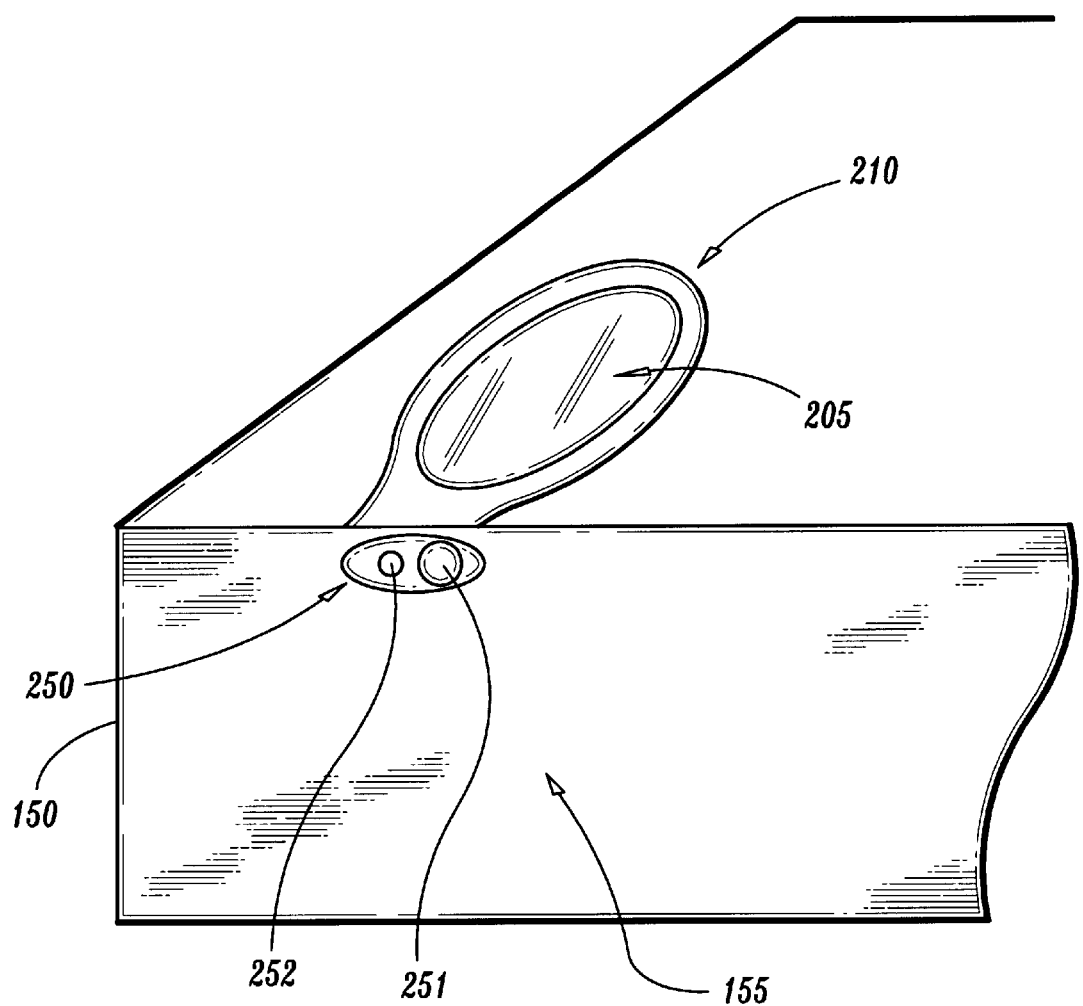
FIG. 2D depicts an exemplary placement of the eye gaze contact detectors in another position inside the vehicular operator compartment according to an embodiment of the present invention.

FIGS. 2a through 2d show possible placements of the eye gaze contact detectors according to embodiments of the present invention. FIGS. 2a and 2b show two exemplary external placements of the eye gaze contact detectors within the sideview mirrors' housings, while FIGS. 2c and 2d show two exemplary internal placements of the eye gaze contact detectors inside the vehicle operator compartment. It is to be appreciated that the eye gaze contact detectors can be placed in various other positions than the ones shown here.

FIG. 2a shows an eye gaze contact detector 250, and its camera 251 and light source 252, located on a sideview mirror housing base 211. The sideview mirror housing base 211 connects the mirror housing 210 to a side 220 of the vehicle. The mirror housing 210 houses an adjustable mirror pane 200 for adjustment by the vehicle operator.

FIG. 2b shows an alternate position in which the eye gaze contact detector 250, the camera 251 and the light source 252 are located on a top portion of the sideview mirror housing 210.

FIG. 2c shows the eye gaze contact detector 250 comprising the camera 251 and the light source 252, located in a post 254 of the vehicle's right side door 150 close in proximity to the sideview mirror housing 210. The vehicle's right side door 150 is shown as seen from the operator's position inside the vehicle compartment.

FIG. 2d shows the eye gaze contact detector 250, and its camera 251 and light source 252 in yet another exemplary position located at the top of the vehicle's interior door panel 155, close in proximity to the sideview mirror. Shown is the right side door 150 as seen from the operator's position from inside the vehicle compartment.

Figure 3:
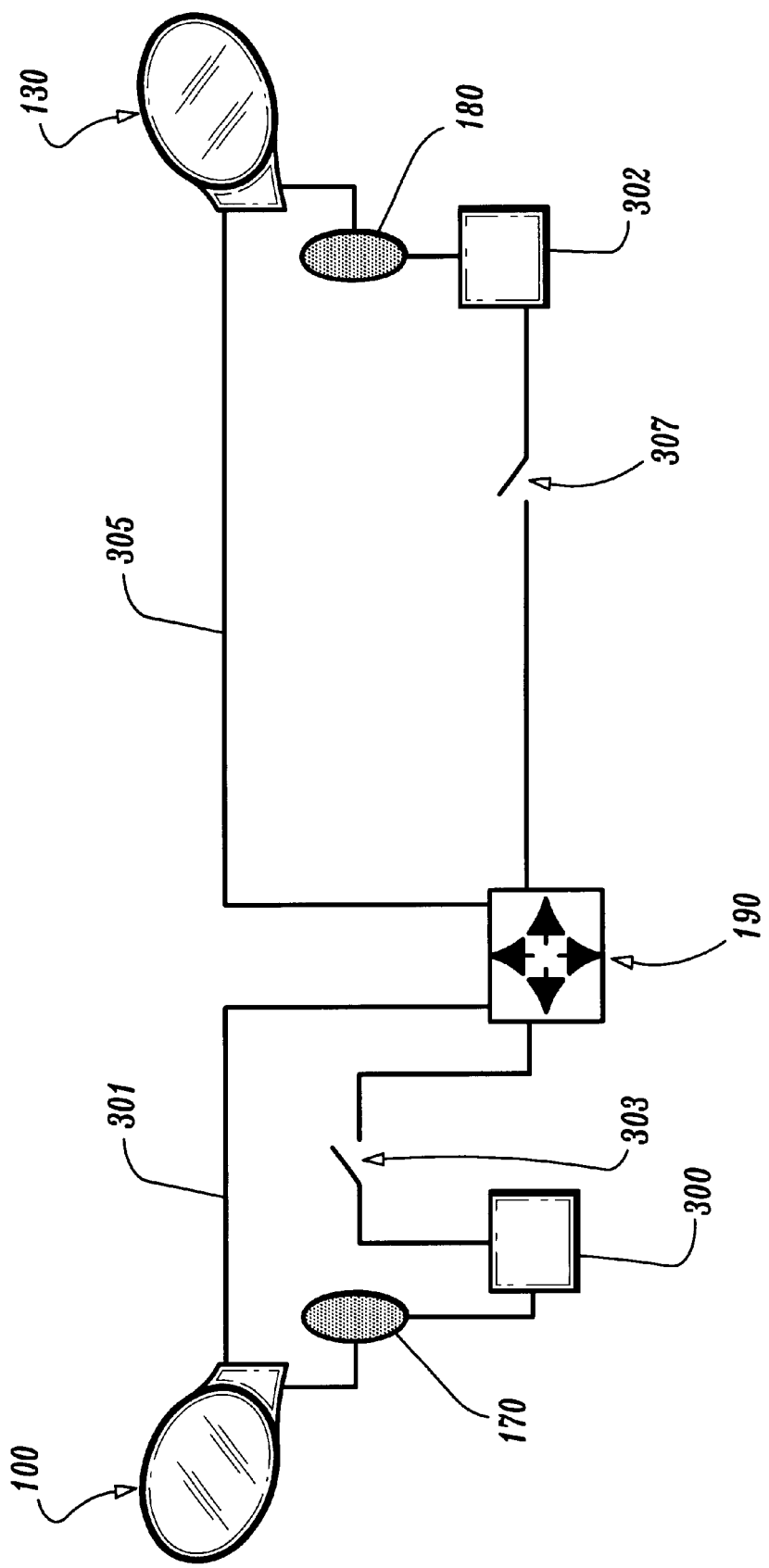
FIG. 3 shows an exemplary system for creating a circuit from a mirror adjustment control to a mirror pane positioning apparatus in a selected mirror based on gaze detection by eye gaze contact detectors according to an aspect of the present invention.

FIG. 3 shows an exemplary system for creating a circuit from the mirror adjustment control 190 to the mirror pane positioning apparatus in a selected mirror based on gaze detection by eye gaze contact detectors according to an aspect of the present invention. In one embodiment for example, the mirror adjustment control 190 is painted with conductive paint, thus allowing the system to detect when the operator touches the mirror adjustment control prior to adjusting a sideview mirror. See Hinckley, K. & Sinclair, M., 1999, "Touch-Sensing Input Devices," Proceedings of 1999 ACM Conference on Human Factors in Computing, pp. 223–230; circuitry internal to the remote-control mirror pane adjustment mechanism generates a square wave to the conductive paint on the control and the capacitance in the operator's hand causes a slight time delay in the wave which can be detected by touch detection circuitry in the remote-control mirror pane adjustment mechanism.

When the mirror adjustment control 190 is touched, the eye gaze contact detectors 170 and 180 are activated. If the left eye gaze detector 170 detects that the operator is gazing towards it (and thus towards the left sideview mirror 100), such information is sent to and analyzed by, for example, a data processing apparatus 300, which determines if there is eye contact within a target area. If there is eye contact within the target area, the data processing apparatus 300 provides output to close a switch 303, so that a circuit 301 can be completed between the mirror pane positioning apparatus (that is, the motors, etc. that move the mirror pane) in the left sideview mirror 100, and the mirror adjustment control 190. Thus, the left mirror is selected for adjustment by the operator (i.e., the mirror selector switch is set to select the left mirror).

Similarly, if the right eye gaze detector 180 detects that the operator is gazing towards it, such information is sent to and analyzed by a data processing apparatus 302, which determines if there is eye contact in a target area. If there is eye contact in the target area, the data processing apparatus 302 provides output to close a switch 307, so that a circuit 305 can be completed between the mirror pane positioning apparatus in the right sideview mirror 130 and the mirror adjustment control 190. In this way the right mirror is selected for adjustment by the operator (i.e., the mirror selector switch is set to select the right mirror.) The data processing apparatuses 300 and 302 may comprise, for example, a computer or an application-specific integrated circuit (ASIC) chip.

There are various ways of determining the eye gaze of a person, that is, determining where or in which direction a person is gazing (looking). See, for example, U.S. Pat. No. 5,861,940, "Eye detection system for providing eye gaze tracking," to Robinson; U.S. Pat. No. 4,973,149, "Eye movement detector," to Hutchinson. Eye gaze devices have been used in a computer-based, human computer interaction-based application. See Zhai et al., 1999, "Manual and Gaze Input Cascaded (MAGIC) Pointing," Proceedings of 1999 ACM Conference on Human Factors in Computing, pp. 246–253.

Eye gaze contact detection depends on pupil detection. One implementation involves detecting the light reflecting off the pupil and the glint reflecting off the surface of the cornea of one or both of the person's eyes. A vision processing system receives from the camera the detected information and processes the relative positions of the location of the pupil and the corneal glint to determine where the eye is gazing.

Figure 4:
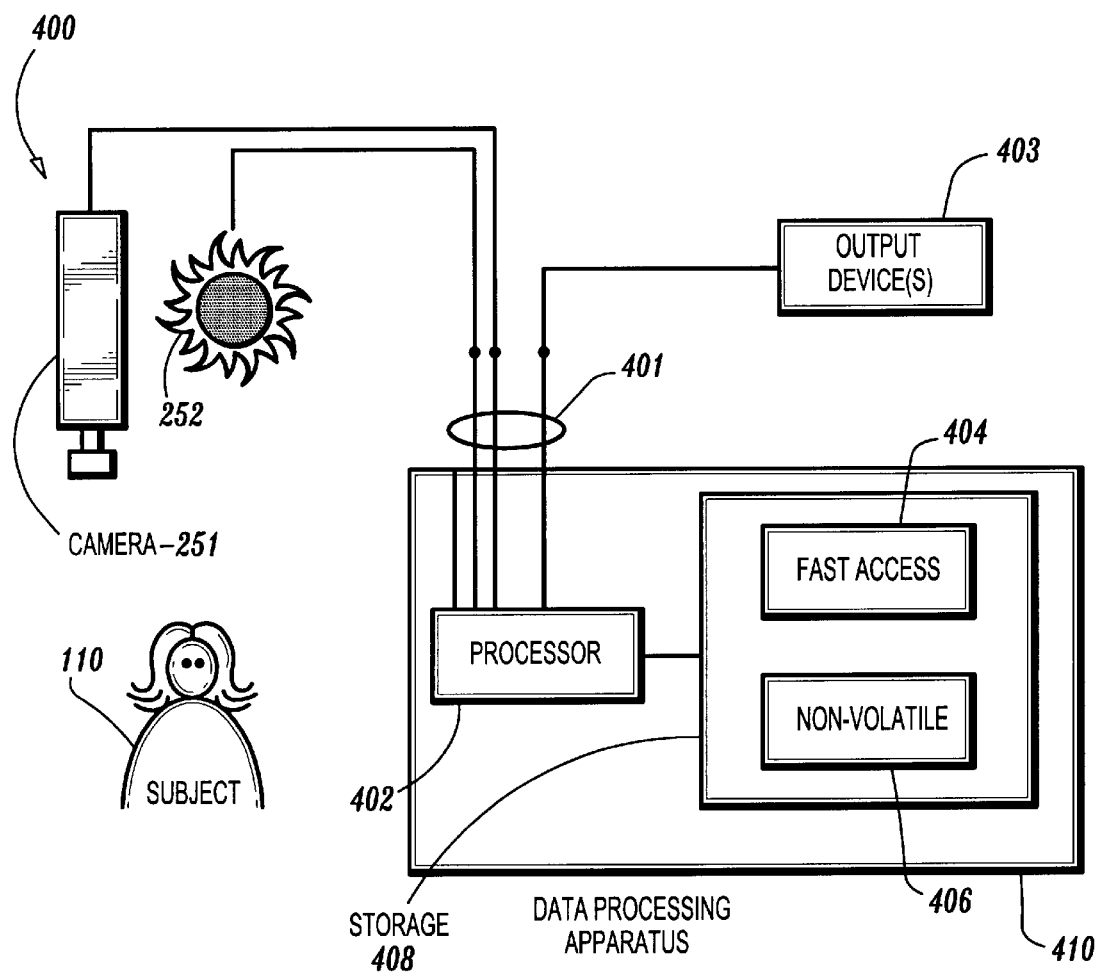
FIG. 4 is an exemplary illustration of an eye gaze sensing system according to an embodiment of the present invention.

FIG. 4 is an exemplary illustration of an eye gaze sensing system according to an embodiment of the present invention. See U.S. patent application Ser. No. 09/225,476, "Method and Apparatus for Determining Eye Contact," commonly assigned to Zhai et. al., and filed Jan. 4, 1999, the disclosure of which is incorporated herein by reference. Generally, the function of the system 400 is to determine whether the operator 110 is looking at a target area. In the present invention, the target area comprises, for example, a sideview mirror of a vehicle, or a vicinity of each sideview mirror.

The system 400 includes a data processing apparatus 410, the camera 251, the light source 252, and an output device 403. It is to be understood that the data processing apparatus 410 is an exemplary representation of the data processing apparatuses 300 and 301 in FIG. 3 above, or the data processing apparatus 905 in FIG. 9 below. An example of the output device in the present invention is the switch 303 (or 307). The light source 252 can be used in a first embodiment ("eye glint embodiment") to create a glint in the operator's eyes, and in a second embodiment ("facial orientation embodiment") to illuminate the operator's facial features. As discussed below, the position of the glint relative to the subject's pupil provides information helpful in determining whether the operator is looking at a target area. The light source 252 may be provided by an incandescent light bulb, fluorescent light bulb, infrared light emitting device, vessel of reacting chemicals or another suitable source, and is used to create a glint in the operator's eyes. Preferably, the light source uses infrared light, so that the operator is not disturbed by the light.

To conveniently cast light upon the operator, the light source emanates light upon a wide area (e.g., omnidirectionally) rather than a collimated beam such as a laser beam. The light source may provide a single distinctive glint, a predetermined concurrent glint pattern, or time-coded glint patterns. To help in creating a recognizable glint, the light source may provide polarized light, a pre-described wavelength of light, etc.

The camera 251 may comprise black/white video cameras, color video cameras, camcorders, etc., and may be sensitive to some or all of the visible spectrum of light, infrared light, or any other wavelength of emitted energy including at least the energy emitted by the light source. The camera 251 may comprise, for example, a wide-angle camera having a wider field of view, or a narrow-angle camera having a narrow field of view.

In the eye glint embodiment, the camera and the light source share the same optical axis (e.g., by use of splitting mirrors, etc.) in order to simplify glint evaluating calculations. By placing the camera 251 and the light source 252 on the same optical axis, the glint in the subject's eyes is central to the subject's pupils if the subject is looking at the camera 251. Glint evaluating calculations may be further simplified by placing the camera 251 and the light source 252 near the target area.

The output device 403 includes one or more devices that receive the results of the present invention's eye contact sensing operation. For ease of illustration, only one output device is depicted, although there may be multiple output devices. In a preferred embodiment, the output device comprises, for example, the switch 303 or 307, which, based on the results of the eye contact sensing operation, is either opened or closed.

The data processing apparatus 410 receives input from the camera 251 and performs computations to determine whether the user is looking at a defined target area. This target area may be predefined by programming the data processing apparatus 410, set by user input, etc. The target area is defined by a particular region, for example, each sideview mirror of a vehicle, or a vicinity of each sideview mirror.

The data processing apparatus includes a processor 402, such as a microprocessor or other processing machine, coupled to a storage 408. For example, the storage 408 can include a fast-access storage 404 (for example, random access memory (RAM)), as well as nonvolatile storage 406.

The data processing apparatus also includes an input/output 401 comprising a number of lines, buses, cables, electromagnetic links, or other means for the processor 402 to exchange data with the hardware external to the data processing apparatus 410, such as the light source 252, the camera 251, and the output device 403. Despite the specific foregoing description, ordinarily skilled artisans will recognize that the apparatus discussed above may be implemented in a machine of different construction, without departing from the scope of the invention. For example, it is to be noted that the components 404 and 406 may be eliminated; furthermore the storage 408 may be provided on-board the processor 402, or even provided externally to the data processing apparatus 410.

Figure 5:
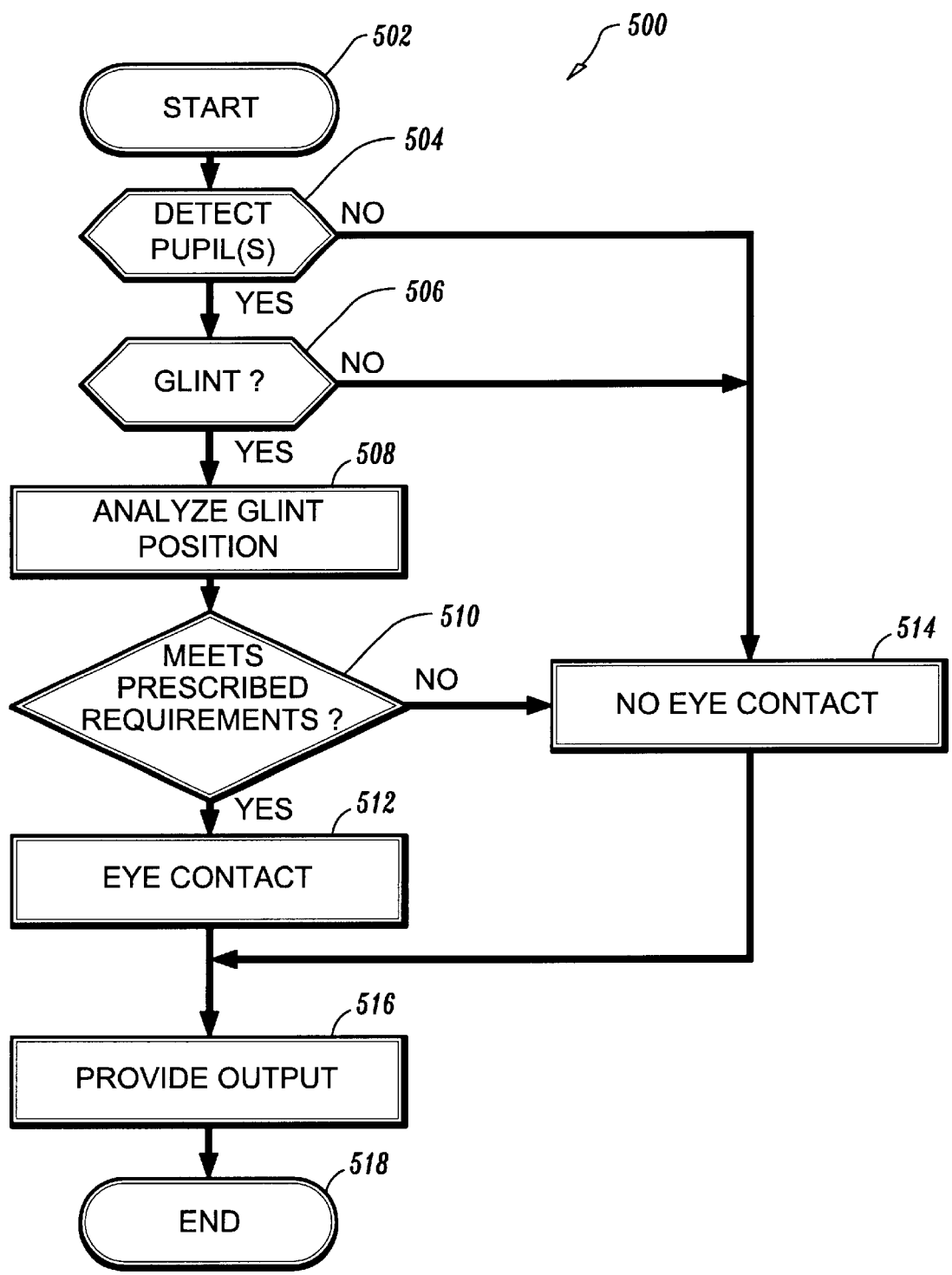
FIG. 5 depicts an example of an operating sequence for sensing eye contact.

FIG. 5 depicts an example of an operating sequence 500 for sensing eye contact. The sequence starts in step 502. First, step 504 detects one or more pupils of the operator 110. This is performed by using the camera to produce an image of the operator 110 and analyzing the image. The analysis identifies the pupils by distinguishing them from other features in the image. Ultimately, step 504 precisely determines the locations of the pupils in the camera image. This operation may be performed by various techniques, such as known filtering processes. Another example of a suitable approach for step 504 is discussed in U.S. Pat. No. 5,016,282 to Tomono et.al., issued on May 14, 1991, which is hereby incorporated by reference in its entirety.

If step 504 does not find any pupils, the system concludes there is no eye contact (step 514), provides a representative output (step 516) to an output device 403, and ends the sequence (step 518).

If one or more pupils are detected, step 504 proceeds to step 506, which determines whether there is a glint. The glint is produced by the cornea of the eye reflecting light from the source 252. More specifically, step 506 is performed by analyzing an image from the camera to determine whether the pupils (found in step 504) exhibit a glint. The features needed to constitute a "glint" may be user specified or preprogrammed into the system. These features include the brightness of the glint region relative to the surrounding pupil, minimum size of glint region, etc. As an example, step 506 may require a brightness higher than a certain percentage of the brightest detected point anywhere in the image, the brightest point in the vicinity of the eye, etc. Other alternatives include creating a particularly recognizable glint by using a pattern source light, time-coded light source, distinct wavelength of light source, polarized light source, etc.

If no glint is detected in step 506, the system concludes that there is no eye contact, provides a representative output and ends the sequence. In contrast, if glint is detected, step 506 advances to step 508, where the system analyzes the relative position of the glint and the pupil. As one example, this may be done by analyzing the camera image to compute the respective centers of the glint and pupil, and then computing a relative measure of their difference. This relative difference may be a number of pixels of the camera image, a percentage of the pupil size, the angle between rays projecting from the eye center through respective centers of the glint and the pupil, absolute distance, etc.

After step 508, step 510 determines whether the relative position of the glint with respect to the pupil meets certain predetermined requirements (step 510). If so, there is eye contact (step 512) with a target area. Otherwise, there is no eye contact (step 514) with the target area. The requirements of step 510 are established in accordance with the desired target area, such that meeting these requirements guarantees eye contact with the desired target area. The target area may comprise, for example, each sideview mirror, or the vicinity of each sideview mirror.

In one embodiment, the requirements of step 510 may specify a minimum level of closeness between the glint and the pupil center, which may be evaluated using a user-specified or preprogrammed threshold. Depending upon the technique used to measure relative difference, this threshold may be a number of pixels (depending on image resolution, focal length of camera lens, etc.), a percentage of pupil size (e.g., ten %), an angle, or an absolute distance (e.g., 1–2 millimeters). Alternatively, instead of using closeness to pupil center, step 510 may analyze whether the glint resides in an area of prescribed shape and size that includes the pupil, for example, an ellipse, a crescent, another shape, or an offset of such a shape from pupil center to accommodate the offset of the fovea from eye's optical axis. Such shapes may also be designed to accommodate misalignment of the camera 251 and/or light source 252 from the target area, etc.

Various alternatives can also be contemplated to the foregoing description where the glint position may be analyzed using empirical data.

After steps 512 or 514, the data processing apparatus 410 provides an output indicating whether there is eye contact or not (step 516). In the illustrated example, the data processing apparatus 410 provides this output to the output device 403. Following step 516, the routine 500 ends in step 518.

Figure 6:
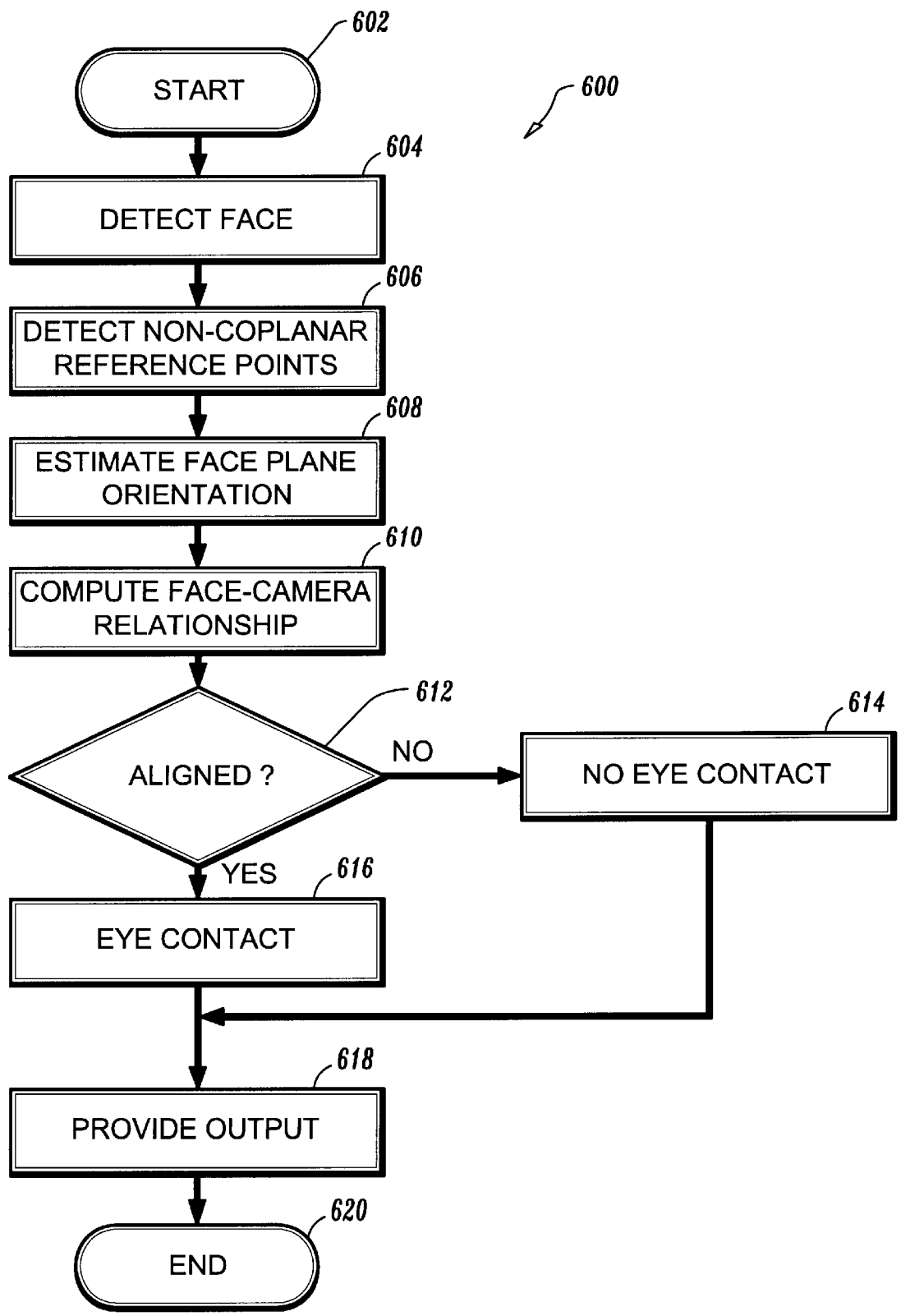
FIG. 6 depicts another example of an operating sequence for sensing eye contact.

FIG. 6 depicts another example of an operating sequence 600 for sensing eye contact. Instead of using glint to sense eye contact, this alternative embodiment analyzes the operator's face orientation to determine eye contact. The sequence is initiated in step 602.

After step 602, the data processing apparatus 410 uses images from the camera 251 to detect the subject's face (step 604). Detection of the face may use various techniques some of which are familiar to ordinarily skilled artisans. For example, face detection may use a combination of attributes such as color, shape, motion, and depth. The template matching scheme is one example of this approach, as described in U.S. Pat. No. 5,550,928 to Lu et al. Skin color analysis is another example, as described in U.S. Pat. No. 5,430,809 to Tomitaka.

Using the image from the camera, the data processing apparatus 410 then proceeds to identify several non-coplanar facial features (step 606). This may involve using intraocular distance to estimate head size and distance from the camera, and to locate other facial features such as eyebrows, nostrils, and mouth.

Next, in step 608, the data processing apparatus 410 estimates the orientation of the subject's facial plane. The facial plane orientation if the subject's "head pose." Steps 604–608 may be performed by various techniques known to ordinarily skilled artisans. Further refinement may be obtained by analyzing the position of the subject's iris relative to the head.

After step 608, the computer determines the relationship between the subject's facial plane orientation and a specified target area (step 610). This target area may be user-specified or pre-programmed into the computer. The object of the sequence is to determine whether the subject is looking at this target area. In the present invention, the target area may comprise, for example, each sideview mirror or the vicinity of each sideview mirror.

Step 610 is performed by the computer calculating the dot product of (1) a vector normal to the subject's facial plane and (2) a vector between the target area and the subject's face. Based upon this calculation, the computer then determines whether the subject's face is sufficiently aligned with the target area (step 612). Alignment may be evaluated, for example, using a user-specified or preprogrammed threshold. If the calculated dot product exceeds the threshold, there is eye contact (step 616). If the calculated dot product is less than the threshold, there is no eye contact (step 614).

After steps 614 or 616, the data processing apparatus 410 provides an output indicating whether there is eye contact or not (step 618). Following step 618, the sequence 600 ends in step 620.

In yet another embodiment, the analysis of glint position and face orientation may be combined to provide a more comprehensive eye contact sensing system.

In yet another embodiment, the glint position may always be initially used to sense eye contact. If glint position is not sufficiently discernible due to the subject's range, than the face plane orientation technique is used as a backup procedure. The discernibility of glint position may be improved by using a high resolution zoom lens, or other suitable magnification techniques.

An output of eye contact from steps 516 or 616 is preferably provided to the switch 303 or 307 to select the sideview mirror that is being looked at. This is implemented by completing a circuit (for example, an electrical circuit) between the mirror adjustment control and the mirror pane positioning apparatus in the sideview mirror that the operator is looking at.

An output of "no eye contact" is also provided to the mirror selector switch, which is then set, for example, to a neutral position, or "None", so that neither sideview mirror is selected. This implies that if either switch 303 or 307 is closed, it is opened, thereby interrupting the circuits to both sideview mirrors. In an alternative embodiment further described below, the output of no eye contact has no effect on the mirror selection switch, such that the mirror selector switch remains set on whatever position it was previously in.

Figure 7:
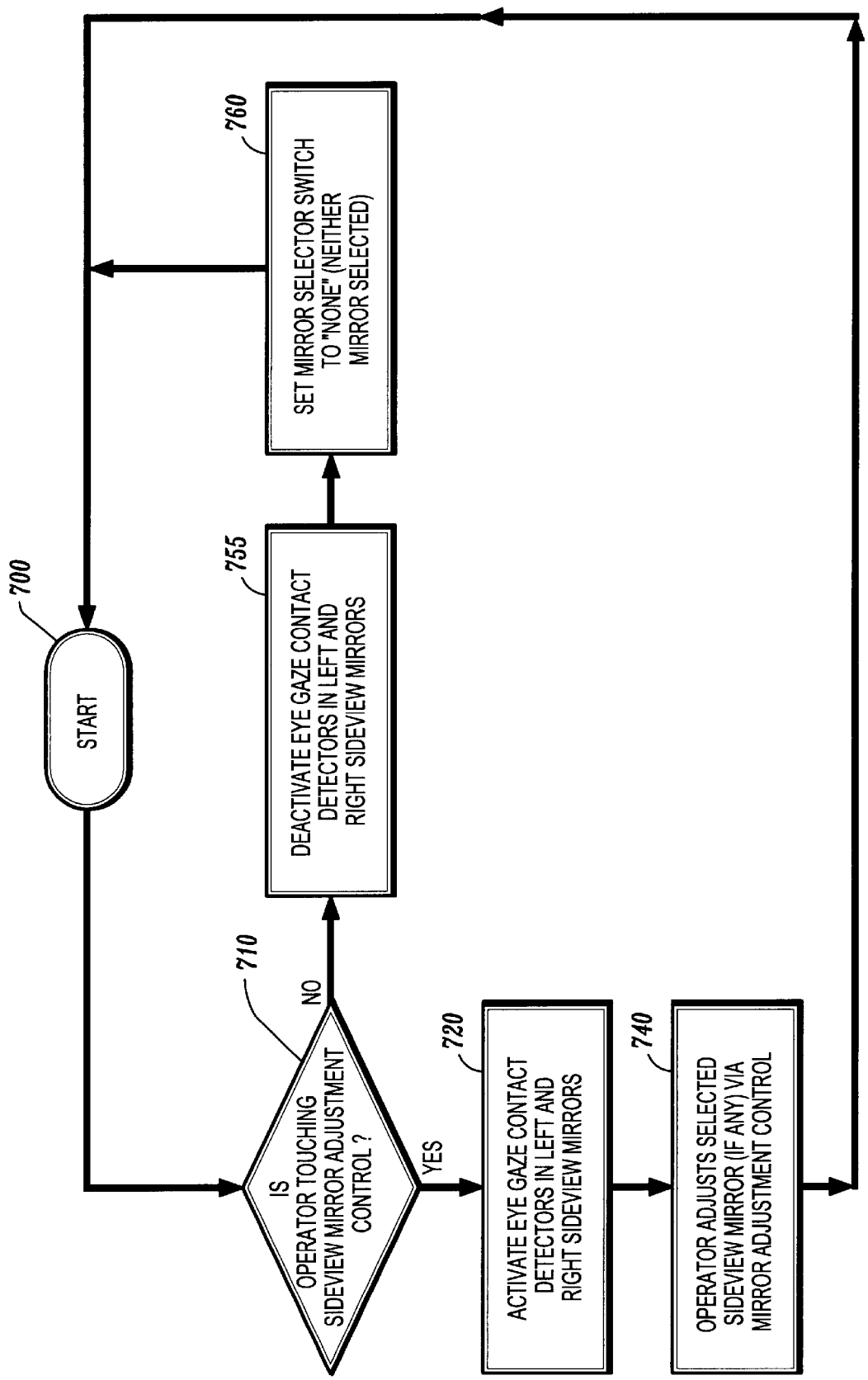
FIG. 7 is a flow diagram of a method of selecting and adjusting a sideview mirror according to a preferred embodiment of the present invention.

FIG. 7 is a flow diagram of a method of selecting and adjusting a sideview mirror using eye gaze contact detectors, according to a preferred embodiment of the present invention. In this embodiment for example, the mirror adjustment control 190 can be painted with conductive paint as described above, thus allowing the system to detect when the operator touches the mirror adjustment control prior to adjusting a sideview mirror. It should be noted that such activation by touching is a power saving feature which is not necessary in the present invention; the system can remain activated as long as the power system is on.

Initially, it is determined whether the operator is touching the mirror adjustment control (step 710). When the operator does touch the mirror adjustment control, the eye gaze contact detectors in the left and right sideview mirrors are activated (step 720). (If the eye gaze contact detectors are already turned on due to, for example, a prior run-through of the flow of FIG. 3, step 720 has no effect on the already-activated eye gaze contact detectors). At the point when the operator touches the mirror adjustment control, the logic portrayed in FIG. 8 below is invoked in each eye gaze contact detector for selecting, for example, a left or a right sideview mirror.

For example, if the operator is looking at a left mirror, that is, if the circuit between the mirror adjustment control and the mirror pane positioning apparatus in the left mirror is complete (as a result of the logic of FIG. 8 executing for the left mirror), the operator's manipulation of the mirror adjustment control results in the adjustment of the left sideview mirror (step 740). Similarly, if the operator is looking at the right mirror (as determined by the logic of FIG. 8 executing for the right mirror), the operator's manipulation of the mirror adjustment control results in the adjustment of the right sideview mirror (step 740). Thus, the operator's manipulation of the mirror adjustment control results in the adjustment of whichever, if any, sideview mirror is currently selected (step 740), based on which (if any) sideview mirror the operator is looking at. It should be noted that if no mirror is selected (i.e., looked at), the operator's manipulation of the mirror adjustment control has no effect on either mirror.

When the user releases and is no longer touching the mirror adjustment control, the eye gaze contact detectors in both sideview mirrors are deactivated (step 755), and the mirror selector switch is set to a neutral position; that is, neither mirror is selected (step 760).

Figure 8:
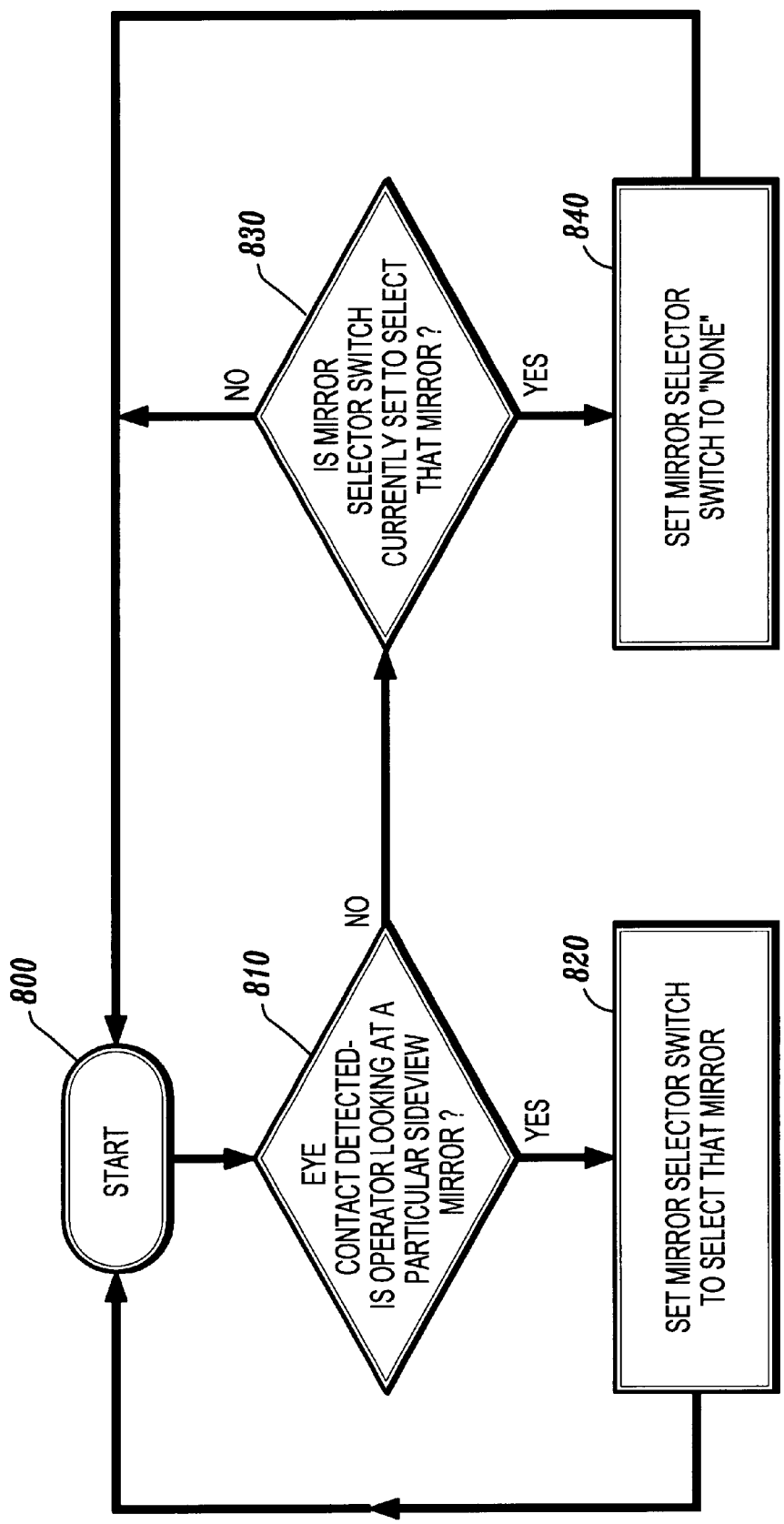
FIG. 8 is a diagram showing an exemplary logic flow which can be activated by step 720 of FIG. 7 for selecting a single sideview mirror that is being looked at according to an embodiment of the present invention.

FIG. 8 is a diagram showing an exemplary logic flow which can be activated by step 720 of FIG. 7 for selecting a single sideview mirror that is being looked at according to an embodiment of the present invention. This logic is invoked, for example, if and when the operator has touched the mirror adjustment control 190, thus indicating a desire to adjust one or both sideview mirrors (step 800). Initially, the eye gaze contact detector determines if the operator is looking at a particular sideview mirror (step 810). If the operator is looking at a particular sideview mirror, the mirror selector switch is set to select that particular sideview mirror (step 820); that is, for example, the switch is set to complete a circuit (for example, an electrical circuit) between the mirror adjustment control and the mirror pane positioning apparatus of the selected sideview mirror.

It is to be understood that the logic flow of FIG. 8 is to be applied to a single sideview mirror at any one time. For example, one eye gaze contact detector could be located near a left sideview mirror and use the logic flow of FIG. 8 to determine if the operator is looking at the left sideview mirror. Conversely, another eye gaze detector could be located near a right sideview mirror and use the logic flow of FIG. 8 to determine if the operator is looking at the right sideview mirror.

As discussed above, for example, in FIGS. 2*a*–2*d,* exemplary positions of the eye gaze contact detectors depict their location as slightly to the side of the actual sideview mirror pane. Advantageously, this allows the eye gaze contact detectors to be slightly "loose" in their "eye contact" determination; thus, the operator's eye gaze need not be directed precisely at an eye gaze contact detector to be detected, but merely near to it.

If the operator is not looking at a particular sideview mirror, then it is determined whether the mirror selector switch is currently set to select that particular sideview mirror (step 830). If yes, than the mirror selector switch is set to a neutral position or "None" indicating that no particular sideview mirror is selected; that is, electrically disconnecting the mirror adjustment control from, for example, both the left and right sideview mirrors, by opening both switches 303 and 307. The eye gaze contact detector is then ready to re-assume the logic of FIG. 8 at the start position (800).

Thus, using the logic of FIGS. 7 and 8, a currently selected mirror could be the left mirror if the eye gaze contact detector associated with the left mirror detects operator eye contact, or the right mirror, or neither (for example, if the operator is looking at neither mirror, the selector switch is set to "None"; that is, there is no electrical contact between the mirror adjustment and either as a sideview mirror (step 840)). While the operator is touching the mirror adjustment control, the system is repeatedly checking whether the operator is looking at the left sideview mirror, the right sideview mirror, or neither sideview mirror. Thus, the operator may switch the selected sideview mirror (the mirror which is to be adjusted by the mirror adjustment control) while still touching and manipulating the mirror adjustment control. For example, the operator may look at the left mirror, touch the mirror adjustment control and adjust the left mirror, turn his/her head to look at the right sideview mirror without releasing his/her hand from the mirror adjustment control, and adjust the right mirror.

In an alternative embodiment, an eye gaze tracking device may be used to select a vehicular sideview mirror. Since there are usually only two sideview mirrors on a vehicle and they are significantly separated in distance, one aspect of the present invention can utilize information as to whether the operator is simply gazing left or right to decide which sideview mirror (the left or right mirror) to select when the operator engages (touches) the mirror adjustment control. Determining whether the operator is gazing to the left or the right can be done, for example, by a single eye gaze tracking device. The single eye gaze tracking device is used to determine the direction of the operator's gaze and is located, for example, in a dashboard of the vehicle in a position that is preferably not blocked from a view of the operator. For example, a steering wheel of the vehicle is preferably out of the line of sight between the eye gaze tracking device and the operator's face.

Figure 9:
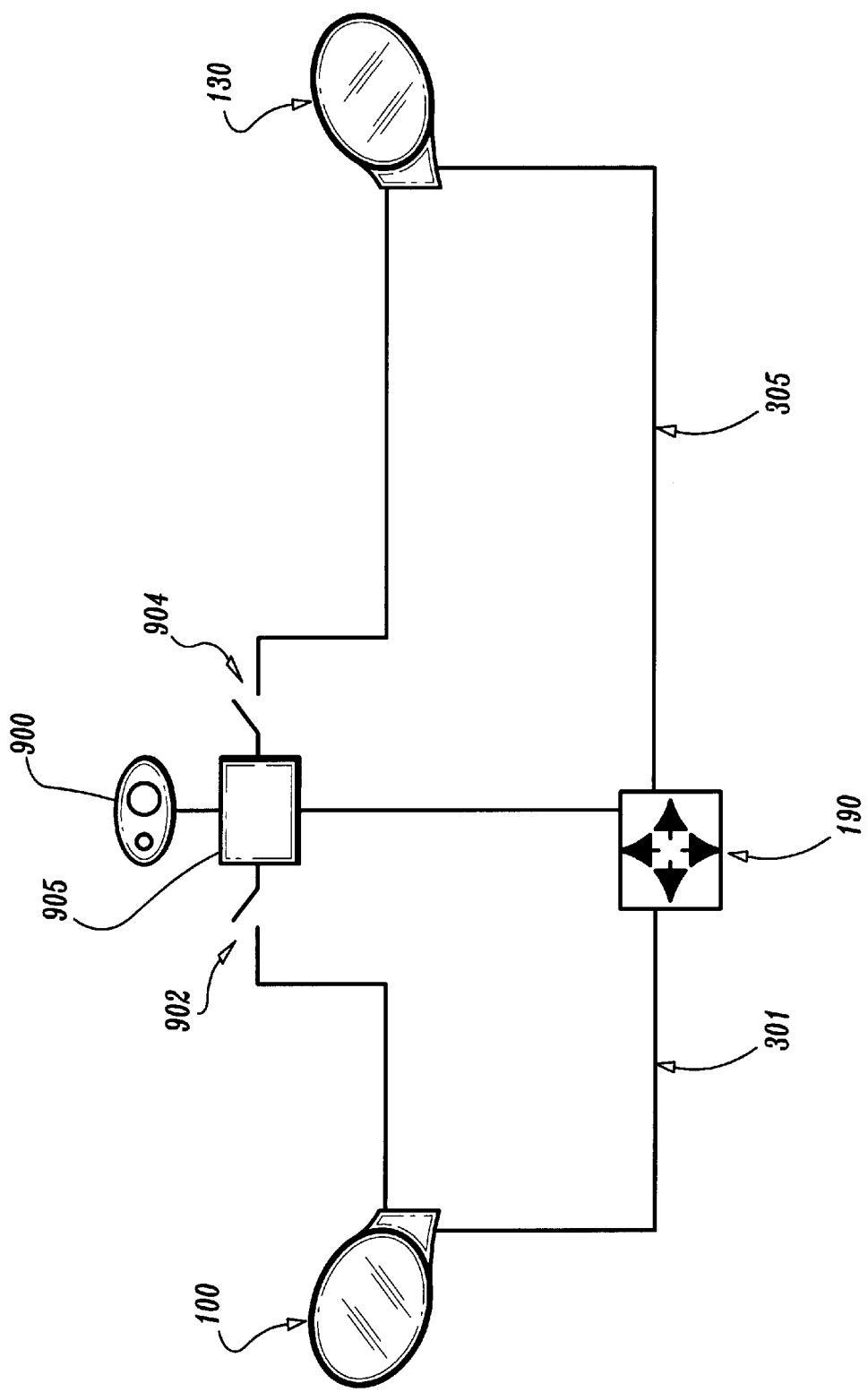
FIG. 9 is an exemplary illustration of another eye gaze sensing system according to an embodiment of the present invention.

FIG. 9 is an exemplary illustration of an eye gaze sensing system using an eye gaze tracking device according to an embodiment of the present invention. The single eye gaze tracking device 900 is preferably located between the sideview mirrors 100 and 130. In one embodiment for example, the mirror adjustment control 190 is painted with conductive paint, thus allowing the system to detect when the operator touches the mirror adjustment control prior to adjusting a sideview mirror.

When the mirror adjustment control 190 is touched, the eye gaze tracking device 900 is activated. If the eye gaze tracking device 900 detects that the operator is gazing towards the left (and thus assumedly towards the left sideview mirror 100), such information can be sent to and analyzed by, for example, a data processing apparatus 905. The data processing apparatus provides output to close a switch 902, so that the circuit (for example, an electrical circuit) 301 can be completed between the mirror pane positioning apparatus (that is, the motors, etc. that move the mirror pane) in the left sideview mirror 100 and the mirror adjustment control 190. Thus, the left mirror is selected for adjustment by the operator (i.e., the mirror selector switch is effectively set to select the left mirror).

Similarly, if the eye gaze tracking device 900 detects that the operator is gazing towards the right, such information is sent to and analyzed by the data processing apparatus 905 which provides output to close a switch 904, so that the circuit 305 can be completed between the mirror pane positioning apparatus (that is, the motors, etc. that move the mirror pane) in the right sideview mirror 130 and the mirror adjustment control 190. In this way the right mirror is selected for adjustment by the operator (i.e., the mirror selector switch is in effect set to select the right mirror.) It is to be noted that the data processing apparatus 905 may comprise, for example, a computer or an application-specific integrated circuit (ASIC) chip.

Figure 10:
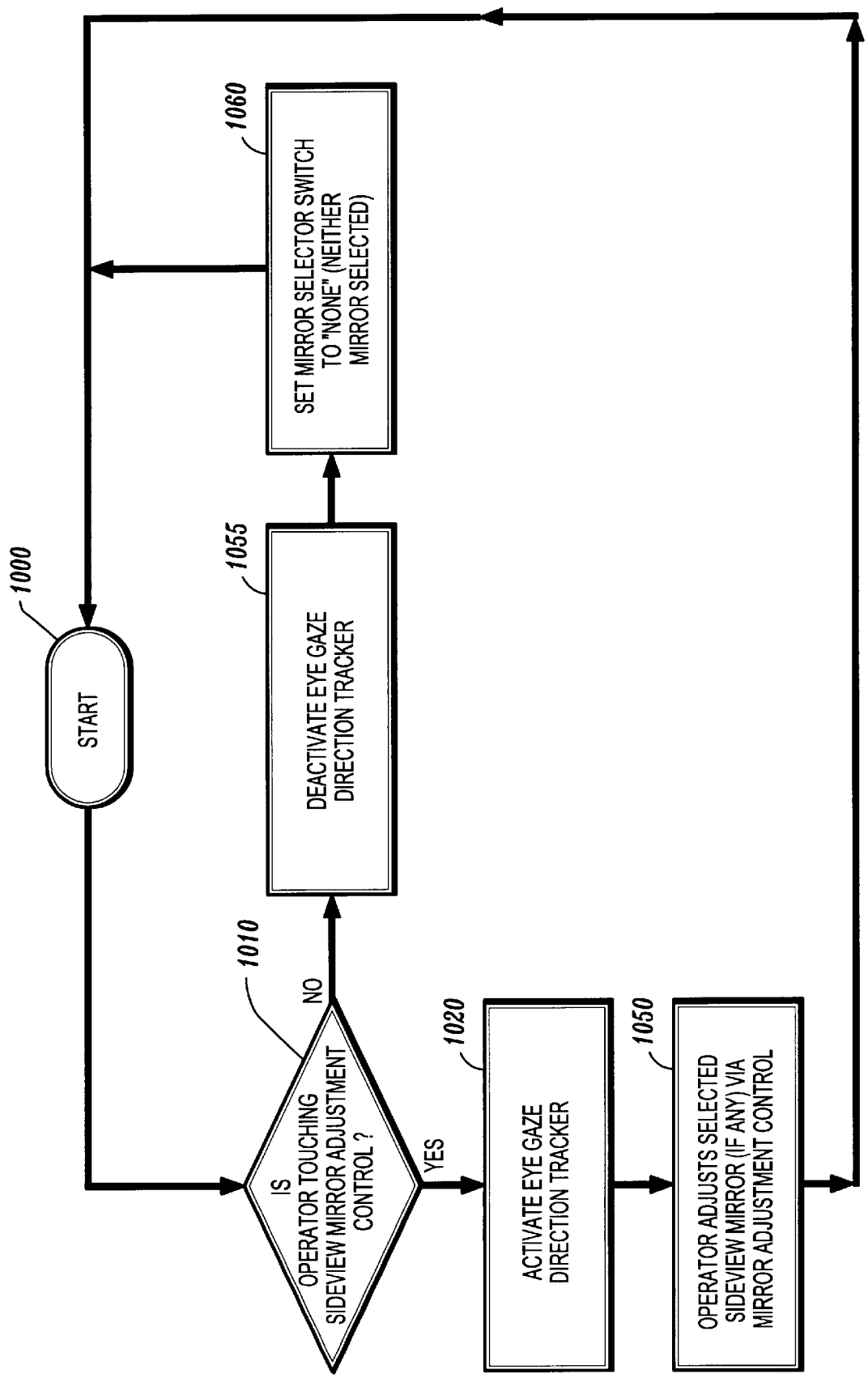
FIG. 10 is an exemplary flow diagram of another method of selecting and adjusting a sideview mirror using an eye gaze tracking device according to an embodiment of the present invention.

FIG. 10 is an exemplary flow diagram of a method of selecting and adjusting a sideview mirror that is being looked at using an eye gaze tracking device according to an embodiment of the present invention. The mirror adjustment control can be, for example, painted with conductive paint, thus allowing the system to detect when the operator touches the mirror adjustment control prior to adjusting a sideview mirror. It is to be noted that the activation by touching the mirror adjustment control is a power saving feature which is not a necessary aspect of the present invention. The system can stay activated as long as the power system is on.

Initially, it is ascertained whether the operator is touching the mirror adjustment control (step 1010). If so, the eye gaze tracking device is activated (step 1020). (If the eye gaze tracking device is already turned on, step 1020 has no effect on the already-activated eye gaze tracking device). Activating the eye gaze tracking device implies starting the logic in FIG. 11 below for the eye gaze tracking device. The logic of FIG. 11 determines whether the operator is gazing towards the left sideview mirror, the right sideview mirror, or neither mirror. Based on this determination, the operator's manipulation of the mirror adjustment control (step 1050) results in adjusting the position of the left sideview mirror, the right sideview mirror or neither mirror.

While the operator is touching the mirror adjustment control, the system is continuously executing the logic in FIG. 10, thereby repeatedly re-checking whether the operator is looking at the left sideview mirror, the right sideview mirror, or neither mirror. This enables the operator to switch the selected sideview mirror (the one which the mirror adjustment control is to adjust) while still touching and manipulating the mirror adjustment control. For example, the operator may look at the left mirror, touch the mirror adjustment control and adjust the left mirror, turn his or her head to look at the right sideview mirror without releasing his/her hand from the mirror adjustment control, and then adjust the right mirror. If the user releases the mirror adjustment control, the eye gaze tracking device is deactivated (step 1055) and the mirror selector switch is set to neutral (that is, neither mirror is selected) in step 1060.

Figure 11:
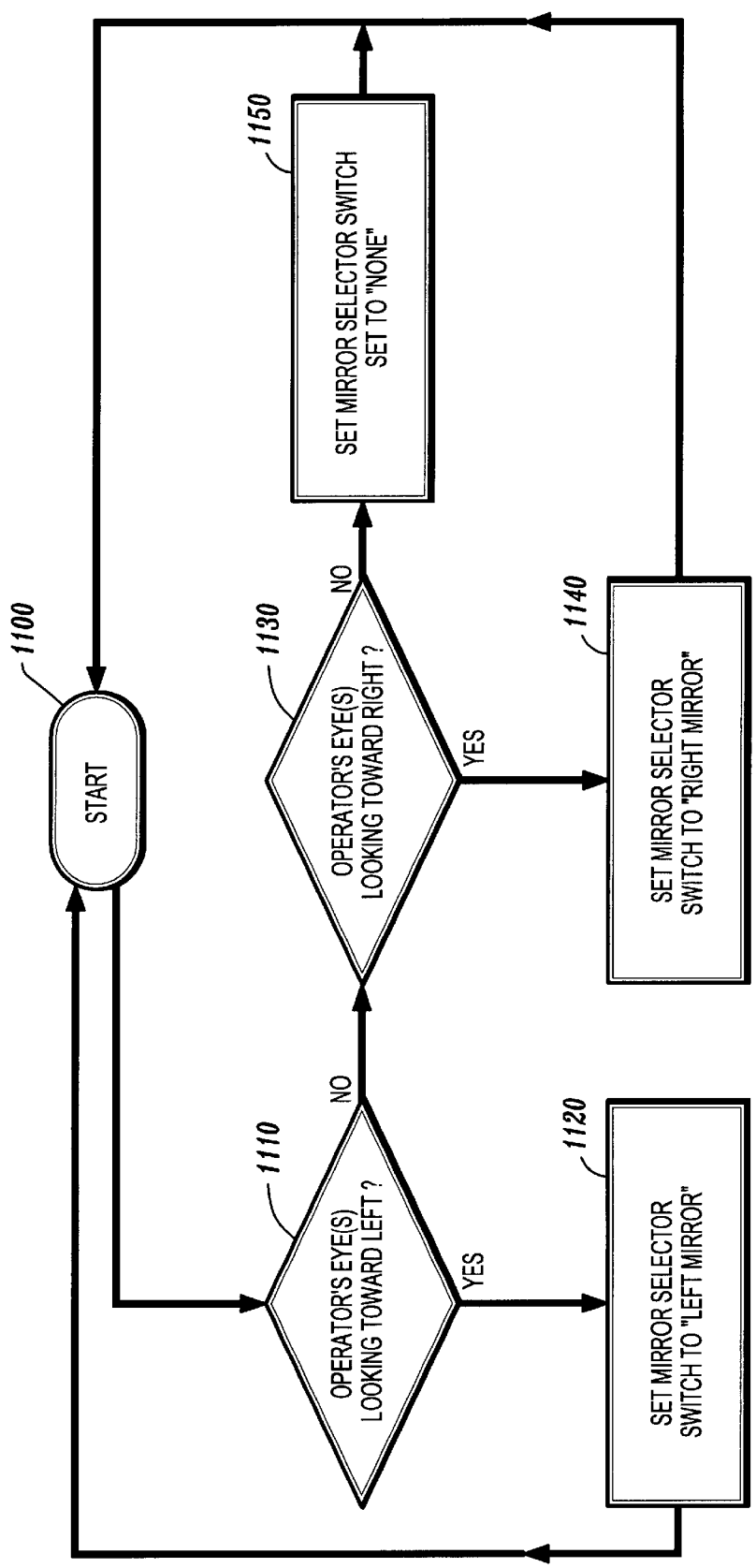
FIG. 11 is a diagram showing an exemplary logic flow which can be activated by step 1020 of FIG. 10 for selecting a sideview mirror that is being looked at according to an embodiment of the present invention.

FIG. 11 is a diagram showing an exemplary logic flow which can be activated by step 1020 of FIG. 10 for selecting a sideview mirror that is being looked at according to an embodiment of the present invention. This logic is invoked, for example, if and when the operator has touched the mirror adjustment control, thus indicating a desire to adjust one or both sideview mirrors. Initially, in step 1110, it is determined if the operator is looking toward the left (thus assumedly toward the left sideview mirror). If so, the mirror selector switch is set to the left sideview mirror (step 1120)—that is, the switch is set to complete a circuit (for example, an electrical circuit) between the mirror adjustment control and the mirror pane positioning apparatus of the left sideview mirror. If the operator is not looking to the left, then it is determined if the operator is looking toward the right (and assumedly toward the right sideview mirror) in step 1130. If so, the mirror selector switch is set to the right sideview mirror (step 1140); that is, the switch is set to complete a circuit (for example, an electrical circuit) between the mirror adjustment control and the mirror pane positioning apparatus of the right sideview mirror.

If the operator is looking neither to the left or right, the mirror selector switch is set to a neutral position (step 1150), indicating that neither the left or the right mirror is currently selected; that is, electrically disconnecting the mirror adjustment control from the mirror pane positioning apparatuses of both mirrors.

In an alternative embodiment, the eye gaze contact detectors can be used for selecting and adjusting a sideview mirror that was last looked at. This can be implemented by eliminating step 760 in FIG. 7 and steps 830 and 840 in FIG. 8, so that if step 810 results in a "no", it will connect back to step 800 directly. In this alternative embodiment, the mirror adjustment control is, for example, painted with conductive paint, thus allowing the system to detect when the operator touches the mirror adjustment control prior to adjusting a sideview mirror. The result is that the "selected" mirror is always the last mirror the operator looked at, even if the operator looks away from that mirror to a position gazing neither at the left nor right sideview mirror. According to this embodiment, the operator may glance at a specific mirror and then look away from that mirror (e.g., towards the front of the vehicle) while manipulating the mirror adjustment control, and this manipulation will result in adjusting the specific mirror most recently gazed at. If the operator looks away from the sideview mirror she intends to adjust (that is, the one most recently glanced at by the operator) and also temporarily removes her hand from the mirror adjustment control (for example, while re-positioning her hand on the control), when she again touches the mirror adjustment control and adjusts the mirror via the mirror adjustment control, the mirror she most recently looked at will be the one that is adjusted.

Similarly, in another alternative embodiment, the eye gaze tracking device can be used for selecting and adjusting a sideview mirror that was last looked at. This can be implemented, for example, by eliminating step 1060 in FIG. 10 and step 1150 in FIG. 11, so that step 1055 connects directly back to step 1000 and the "no" branch from step 1130 connects directly back to step 1100. As described in the above alternative embodiment of the eye gaze contact detectors, the result is that the "selected" mirror is always the last mirror the operator looked at, even if the operator looks away from that mirror to a position gazing neither towards the left or the right sideview mirror. According to this additional alternative embodiment, the operator may glance at a specific mirror and then look away from that mirror (e.g., towards the front of the vehicle) while manipulating the mirror adjustment control, and this manipulation will result in adjusting the specific mirror most recently gazed at. If the operator looks away from the sideview mirror she intends to adjust (that is, the one most recently glanced at by the operator) and also temporarily removes her hand from the mirror adjustment control (for example, while re-positioning her hand on the control), when she adjusts the mirror via the mirror adjustment control, the mirror she most recently looked at will be the one that is adjusted.

Advantageously, both these alternative embodiments of the eye gaze contact detectors and eye gaze tracking device make it possible for an operator to adjust a particular sideview mirror without having to look at or towards that mirror continuously, which would be hazardous when the vehicle is in motion.

It is to be noted that the mirror adjustment control of the present invention need not be painted with conductive paint for activating the eye gaze detectors, i.e., the system can always be activated or "on" such that the eye gaze detectors are in a constant loop of detecting eye gaze.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the present invention. All such changes and modifications are intended to be included within the scope of the invention as defined by the appended claims.

What is claimed is:

1. A system for selecting a sideview mirror of a vehicle comprising:
    an eye gaze detector for detecting an eye gaze of an operator;
    a data processing apparatus for receiving input from the eye gaze detector and determining whether the operator is looking at a sideview mirror, wherein if the operator is looking at the sideview mirror, the sideview mirror is selected; and
    a mirror adjustment control for adjusting the selected sideview mirror.

2. The system of claim 1, wherein the eye gaze detector is an eye gaze contact detector for detecting contact of the eye gaze of the operator.

3. The system of claim 1, wherein the eye gaze detector is an eye gaze tracking device for determining a direction of an eye gaze of an operator.

4. The system of claim 1, wherein the mirror adjustment control is painted with conductive paint for detecting when the operator touches the mirror adjustment control, wherein when the operator touches the mirror adjustment control, the eye gaze detector is activated.

5. The system of claim 1, wherein the data processing apparatus selects the sideview mirror by completing an electrical circuit between the mirror adjustment control and a mirror pane positioning apparatus of the selected sideview mirror.

6. The system of claim 2, wherein the eye gaze contact detector is located on an interior door panel of a vehicle door.

7. The system of claim 3, wherein the eye gaze tracking device is located on a dashboard of the vehicle in a line of sight with the eye gaze of the operator.

8. A method of automatically selecting a sideview mirror in a vehicle comprising the steps of:
    activating an eye gaze contact detector for detecting eye contact in a sideview mirror; and
    determining if an operator is looking at the sideview mirror using a data processing apparatus, wherein if the operator is looking at the sideview mirror, a mirror selector switch is set to select the sideview mirror for adjustment by the operator using a mirror adjustment control.

9. The method of claim 8, wherein if the operator is not looking at the sideview mirror, further comprising the steps of determining if the operator is looking at a second sideview mirror, wherein if the operator is looking at the second sideview mirror, the mirror selector switch is set to select the second sideview mirror for adjustment using the mirror adjustment control.

10. The method of claim 8, wherein the step of activating is initiated by touching the mirror adjustment control, wherein said mirror adjustment control is painted with conductive paint for detecting when the operator is touching the mirror adjustment control.

11. The method of claim 8, wherein the sideview mirror is a left vehicular sideview mirror.

12. The method of claim 8, wherein the eye gaze contact detector is located on an interior door panel of a first vehicle door.

13. The method of claim 8, wherein the data processing apparatus selects the sideview mirror by completing an electrical circuit between the mirror adjustment control and a mirror pane positioning apparatus of the selected sideview mirror.

14. The method of claim 9, wherein the data processing apparatus selects the second sideview mirror by completing an electrical circuit between the mirror adjustment control and a mirror pane positioning apparatus of the selected second sideview mirror.

15. The method of claim 9, wherein the second sideview mirror is a right vehicular sideview mirror.

16. The method of claim 9, wherein if the operator is not looking at the second sideview mirror, the mirror selector switch is set to a neutral position.

17. The method of claim 11, wherein if the operator is not touching the mirror adjustment control, the mirror selector switch is set to a neutral position.

18. A method of automatically selecting a sideview mirror comprising the steps of:

activating an eye gaze tracking device for detecting a direction of an eye gaze of an operator;

determining if the operator is looking towards a first sideview mirror using a data processing apparatus, wherein if the operator is looking towards the first sideview mirror, a mirror selector switch is set to select the first sideview mirror to be adjusted by the operator using a mirror adjustment control, and if the operator is not looking towards the first sideview mirror, further comprising the steps of:

determining if the operator is looking towards the second sideview mirror using the data processing apparatus, wherein if the operator is looking towards the second sideview mirror, the mirror selector switch is set to select the second sideview mirror to be adjusted by the operator using the mirror adjustment control.

19. The method of claim 18, wherein if the operator is not looking towards the second sideview mirror, the mirror selector switch is set to a neutral position.

20. The method of claim 18, wherein the data processing apparatus selects the first sideview mirror by completing an electrical circuit between the mirror adjustment control and a mirror pane positioning apparatus of the selected first sideview mirror.

21. The method of claim 18, wherein the data processing apparatus selects the second sideview mirror by completing an electrical circuit between the mirror adjustment control and a mirror pane positioning apparatus of the selected second sideview mirror.

* * * * *